TELEVISION RECEIVER NOISE INVERSION CIRCUIT

Original Filed Aug. 5, 1963

INVENTOR.
Richard A. Kraft
BY Mueller & Aichele
Attys.

United States Patent Office 3,458,653

Patented July 29, 1969

3,458,653

TELEVISION RECEIVER NOISE INVERSION CIRCUIT

Richard A. Kraft, Palatine, Ill., assignor to Motorola, Inc., Chicago, Ill., a corporation of Illinois Continuation of application Ser. No. 299,815, Aug. 5, 1963. This application Sept. 28, 1966, Ser. No. 582,763
Int. Cl. H04n 5/60
U.S. Cl. 178—7.3 7 Claims

ABSTRACT OF THE DISCLOSURE

A noise inversion circuit is provided in a television receiver to effect reduction of impulse noise and thereby enhance the performance of the sync separator, agc circuits, and overall picture reproduction. In particular a triode electron tube with its cathode tied to a source of fixed potential is employed as the noise inverter. A portion of the video signal is derived from the video amplifier plate circuit and is applied to the grid of the noise inverter triode. Noise impulses, or spikes, present in the video signal will appear at the plate of the triode in inverted form. These are applied through suitable coupling means to the agc and sync separator circuits to cancel out corresponding noise impulses appearing at those circuit points. The plate circuit of the triode additionally incorporates a potentiometer to establish the conduction point of the triode.

This application is a continuation of S.N. 299,815 filed Aug. 5, 1963 and now abandoned.

This invention relates to television receivers and more particularly to noise cancellation systems for such receivers.

Impulse noise accompanying a television signal can cause various problems in a receiver, such as tearing of the picture, loss of synchronization, and incorrect response of an automatic control system. The usual method of overcoming these adverse effects of noise is to amplitude separate the noise pulses from the television signal and then combine these separated noise pulses with the television signal including the noise, in a cancellation or subtraction process to leave only the desired television signal. Amplitude separation of noise pulses is feasible, of course, because the troublesome noise generally extends in amplitude considerably beyond the synchronizing pulse tips in the received signal.

Prior art noise cancelling systems have often required numerous components and circuitry which necessitated rather careful adjustment to insure that proper and relatively complete noise cancellation was obtained. For example, the noise separation must be carried out in such a way that the noise pulses are separated at or very near the tips of the synchronizing signals; separation at too low a level will result in cancellation of the synchronizing signal itself, whereas separation at too high a level results in incomplete cancellation of the noise. Thus, the setting of the operating level of the noise separator can be signicifient and may require adjustment depending on the level of the signal in the receiver.

A still further difficulty with many prior known noise cancelling systems is that the separated noise pulse to be used for cancelling purposes did not correspond entirely with the representation of that pulse in the desired signal. For example, the cancelling pulse may be derived in one part of the receiver and combined with the video signal plus the noise pulse from another part of the receiver. The two noise components may differ to some degree if these pulses had not both been translated through the same receiver stages. Accordingly, the cancellation operation would be imperfect to the extent of the difference between the pulse used to cancel and the pulse with the desired signal.

An object of this invention is to provide an improved noise cancelling circuit of simple and inexpensive construction.

Another object is to more effectively and completely cancel impulse noise in television signals, which signals are utilized in stages such as the synchronizing signal separator or automatic gain control systems of a receiver.

Another object is to reduce or obviate the criticality of adjustment of a noise cancelling system in a television receiver.

In a specific form of the invention the noise cancelling system utilizes a demodulated video signal plus any accompanying noise pulses, as developed across the output impedance of a video amplifier in a television receiver. A three element noise separating device, or triode vacuum tube, includes input electrodes connected across the video load impedance so that the noise separating device is driven toward conduction by the synchronizing pulses of the signal. The output electrode of the separating device is connected through a noise inverter load impedance to a suitable potential established at a level to permit conduction of the separating device only by signals exceeding the level of the tips of the synchronizing components. Thus, amplitude separated and amplified noise pulses are available at the output electrode to be fed back to an impedance across which the complete signal appears for cancelling the noise pulses appearing therein. Therefore, the video signal without accompanying noise pulses is available for the synchronizing signal separator or the automatic gain control circuits in the receiver. This simple noise separator and cancellation circuit thus provides very complete noise removal. Furthermore, utilizing noise and desired signal from the output of the video amplifier advantageous finds these signals at a high level compared to the conduction level (cutoff) of the noise separating device. This, as well as having the noise separating level established in the output circuit of the separating device, both reduce the criticality of adjustment of the operating point of the noise cancelling circuit.

Figures 1, 2, 3:
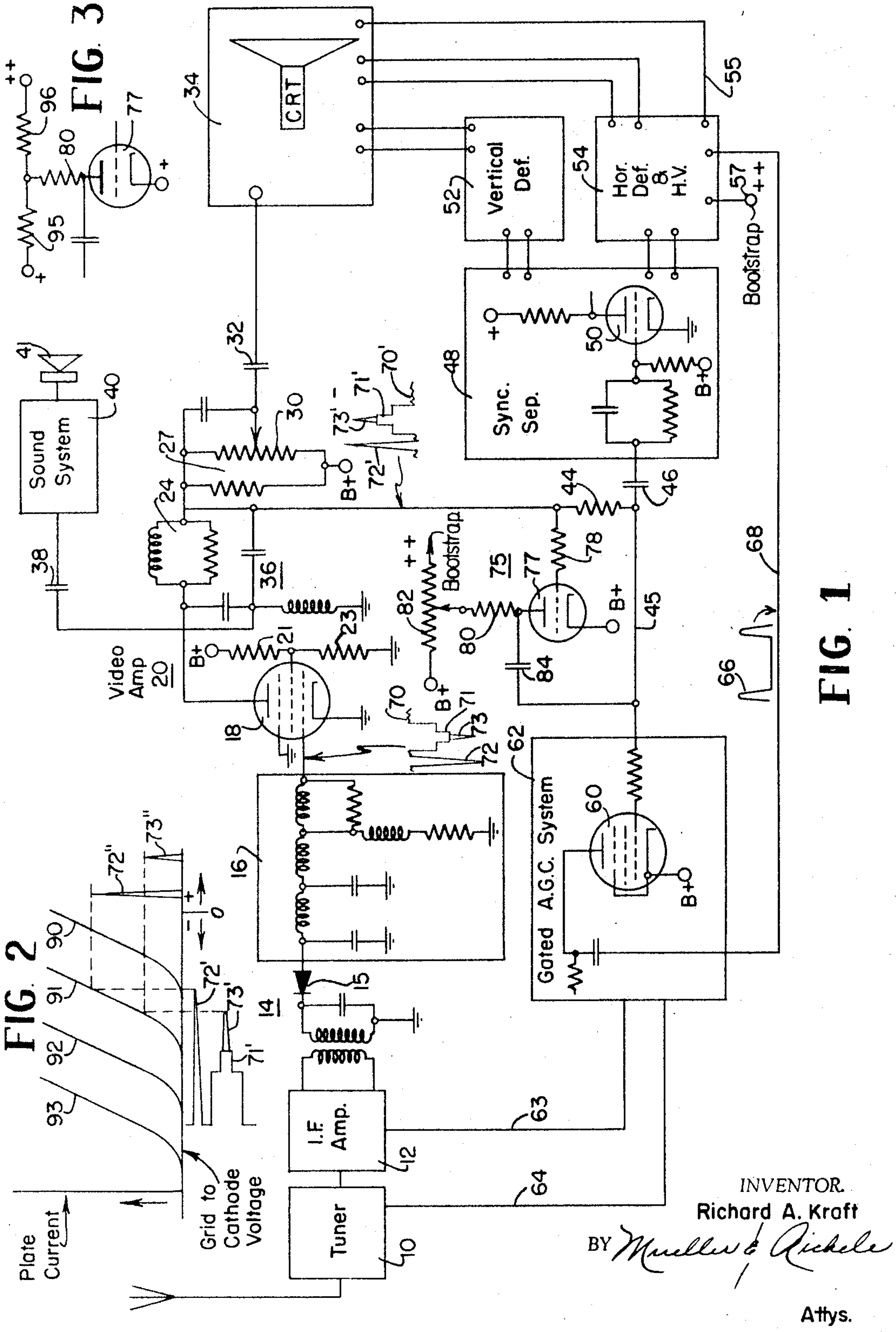
FIG. 1 is a diagram, partly schematic and partly in block, of a television receiver incorporating the invention.
FIG. 2 is a representation of tube operating curves useful in explaining operation of the invention.
FIG. 3 is a schematic diagram of a modified portion of the circuit of FIG. 1.

The television receiver of FIG. 1 includes a tuner 10 having an RF amplifier, a mixer, and an oscillator in order to select a desired signal and reproduce that signal as one of intermediate frequency. The intermediate frequency signal is applied to the IF amplifier stage 12 and from there to the video detector 14. The detector 14 includes a rectifier device 15 and a detector load and peaking circuit 16. The video detector 14 is direct current coupled to the control grid of the amplifier tube 18 in the video amplifier 20.

The demodulated video signal, including video frequency components, horizontal and vertical synchronizing components, and possible noise pulses exceeding the amplitude of the synchronizing components, are all amplified in the pentode tube 18. The cathode of tube 18 is grounded and the screen grid thereof is energized by a voltage divider 21, 22. The anode of tube 18 is connected through the peaking network 24 and through the video load resistor 27 to a positive potential source.

A portion of the amplified video signal is derived from the contrast control 30, which is connected across the load resistor 27 and this video signal is applied through the coupling capacitor 32 to the grid-to-cathode circuit of the cathode ray tube apparatus 34. A sound take-off network 36 is also connected between the anode of tube 18 and ground so that the 4.5 megacycle sound subcarrier is coupled through the capacitor 38 to the sound system 40. Sound system 40 may include the usual amplifier and FM detector plus suitable audio frequency amplification in order to properly drive the loudspeaker 41.

The composite video signal available at the anode of tube 18 is also coupled through the resistor 44, lead 45 and the capacitor 46 to the synchronizing signal separator circuit 48. The circuit 48 includes a vacuum tube 50 and associated circuitry to function in a known manner for amplitude separating the horizontal and vertical synchronizing pulses from the composite video signal. Further circuitry associated with the separator circuit 48 develops the vertical synchronizing pulses at 60 cycles per second and applies these to the vertical deflection system 52. System 52 is designed to produce the usual sawtooth deflection current for energizing a deflection yoke of the cathode ray tube apparatus 34.

The separator circuit 48 is also connected to the horizontal deflection and high voltage system 54. Accordingly, the horizontal deflection pulses of the received signal properly time the operation of the system 54 to produce sawtooth deflection current at 15.75 kc. for the yoke of the cathode ray tube apparatus 34. In accordance with usual practice the system 54 also produces a high voltage of 20 kv. or more to be applied through lead 55 to the screen of the cathode ray tube in the apparatus 34. The system 54 may also provide at terminal 57 a "bootstrap" potential. This is developed by the horizontal sweep system in a known manner to develop a potential of high value, for example, 480 volts.

The anode of the video amplifier tube 18 is also coupled DC through resistor 44 and lead 45 to the control grid of the automatic gain control tube 60. The tube 60 is in the gated AGC system 62 which provides a control voltage over leads 63, 64 to the IF amplifier 12 and the tuner 10 respectively. This control voltage is dependent on the strength of the received signal (which is DC coupled from the video detector 14 to the tube 60) and is utilized in a well-known manner to tend to maintain a constant amplitude signal in the video amplifier 20 despite variations in signal input level. The gain control system 62 is rendered operative by means of pulses 66 which are at the horizontal deflection frequency and are coupled by lead 68 from system 54 to the anode of the tube 60. By means of this circuitry the gain control system responds to the desired signal only during the presence of the synchronizing pulses of the signal thereby reducing the tendency for the gain control system to respond to spurious noise signals which might occur between the synchronizing pulses.

The television receiver so far described in FIG. 1 is of previously known construction and further elaboration of its operation is unnecessary herein. The deleterious effect of impulse noise signals accompanying the demodulated video signals is also known. For example, the demodulated signal 70 appearing at the control grid of tube 18 includes a synchronizing pulse 71 and spurious noise impulses 72, 73. This negative-going signal is amplified in the amplifier 20 and appears across the load resistor 27 as shown by the inverted and amplified waveforms 70'–73'. The noise impulse 72' being of greater amplitude than that of the synchronizing pulse 71' may be recognized by the synchronizing signal separator 48 as a sync pulse thereby causing improper synchronization of the deflection circuits 52 and 54 and improper deflection of the beam in the cathode ray tube. A noise pulse of sufficient energy could cause sufficient grid current in the separator tube 50 to charge capacitor 46 such that a number of desired pulses 71' occur while the tube 50 is biased to cutoff due to the charge on capacitor 46. Therefore, it can be seen that loss of synchronization can occur due to the appearance of noise pulses so that there can be tearing of the picture or even complete loss of synchronization and rolling of the picture in the vertical direction due to such noise pulses.

A noise pulse such as pulse 73' can also cause false control of the gated AGC system 62. Since the noise pulse 73' occurs during the time of the sync pulse 71' and thus during the time that the system 62 is responsive to the gating pulses 66 applied thereto, the system 62 will recognize the pulse 73' as a desired signal of greater energy than the television signal itself actually contains. Therefore, the AGC voltage will be falsely established at a level to reduce the gain of the receiver.

In order to overcome these undesired effects of impulse noise, the noise cancelling circuit 75 is operative in the output network for the video amplifier 20.

The triode vacuum tube 77 includes a control grid which is connected through resistor 78 to the plate of video amplifier tube 18. The cathode of tube 77 is connected to a positive potential source so that the grid and cathode of tube 77 are effectively connected across the video load resistor 27 and are biased by the signal voltage existing across that resistor. The plate of tube 77 is connected through the noise inverter load resistor 80 to the arm of a potentiometer 82. The fixed portion of the potentiometer 82 is connected between the positive B+ potential source and a higher positive voltage such as the bootstrap potential available at terminal 57 of the horizontal deflection system 54. The function of the potentiometer 82 is to provide a positive voltage of the proper amount in excess of the potential on the cathode of tube 77 in order to establish the conduction point of tube 77 with respect to the particular signal applied to its control grid. The output signal from tube 77 is taken from its anode through the coupling capacitor 84 and lead 45 to the bottom side of resistor 44.

In understanding the operation of the noise cancelling system, it may be noted that the tips or most positive portions of the synchronizing pulses 71' will be at a direct current potential which is somewhat less positive than the B+ potential applied to the video load impedance 27. The cathode of tube 77 is also at a potential more positive than the peak of puses 71', which is conveniently B+ also. The conduction point of the tube 77 can be adjusted by picking a proper value of the plate supply voltage, that is, making a proper setting of the potentiometer 82 so that the anode is more positive than the cathode voltage. The relationship for this conduction point can be expressed as: grid conduction voltage$=V/\mu$ where V is the voltage at the anode of tube 77 and $\mu$ is the amplification factor of the triode tube 77. Thus, the anode voltage of tube 77 is above B+ and at a point where the tube will just conduct with a signal slightly exceeding the pulse 71' applied to the control grid thereof. Therefore, only the noise pulses extending above the tips of the pulses 71' will cause conduction of tube 77.

With the noise separating device rendered conductive only during the occurrence of noise pulses exceeding the amplitude of the synchronizing pulses, the noise pulses will appear in separated, inverted and amplified form at the lead 45. Since lead 45 would also carry the total composite video signal including the noise pulses, as represented by the waveform 70′–72′, the separated noise pulses with a negative going polarity will cancel the corresponding noise pulse of positive going polarity which accompanies this desired video signal across resistor 44. Accordingly, only the desired signal with video components and synchronizing components remains on lead 45 to be applied to the separator circuit 48 and the AGC system 62.

It will be noted that resistor 44 serves the function of isolating the input to the noise cancelling circuit from the output thereof and therefore becomes the impedance across which the cancellation takes place. Resistor 78 isolates the input circuit to the tube 77 from the video translating network in the amplifier stage 20.

FIG. 2 shows the operation of the vacuum tube triode 77 in performing the noise inversion function. It will be noted that the synchronizing pulses 71′ are applied to the noise cancelling circuit with a relatively constant amplitude due to the automatitc gain control system of the receiver. Accordingly, the potentiometer 82 is adjusted to apply a positive potential to the anode of tube 77 so that the tube just remains out of conduction during the occurrence of these synchronizing pulses. In FIG. 2 several curves of grid-to-cathode voltage versus anode current for fixed anode voltage of tube 77 are shown. These curves are 90, 91, 92 and 93. In the illustrated case the curve 91 is established by setting of the potentiometer 82 so that essentially zero plate current is conducted in tube 77 until the occurrence of a noise pulse (such as pulses 72′ or 73′) which exceeds the amplitude of the synchronizing pulse 71′. Upon the occurrence of these noise pulses the tube 77 does draw current so that its output signal is in the form of the inverted and amplified pulses 73″ and 72″ to be used for cancelling purposes across the resistor 44.

The proper amplitude separation of the noise pulses from the remainder of the signal is established by a voltage divider in the anode circuit of the noise separating device rather than in the grid bias circuit therefor. Furthermore, the signal applied to the noise separating device is at a high amplitude since it has been amplified by the video amplifier. Therefore, adjustment of the tube conduction point is not critical in order to obtain very satisfactory noise cancellation. In fact, as shown in FIG. 3, the potentiometer 82 may take the form of fixed resistors 95 and 96 with the values thereof chosen, well within production tolerances, to give satisfactory noise reduction. This would eliminate the variable potentiometer 82 which conceivably could be misadjusted by persons unfamiliar with the operation of the overall noise cancelling system.

In the described circuit no special tubes need be used and neither are the other circuit components of critical value. Parts values for a system which is satisfactorily operative are as follows:

| | |
|---|---|
| Tube **18** | 16GK6 |
| Resistor **27** ohms | 5,600 |
| Resistor **44** do | 18,000 |
| Tube **77** (triode portion) | 9A8 |
| Resistor **78** ohms | 22,000 |
| Resistor **80** do | 330,000 |
| Potentiometer **82** megohms | 1 |
| Capacitor **84** microfarads | .1 |
| B+ volts | 135 |
| Bootstrap potential do | 450 |

In some prior circuits the source of pulses for cancelling purposes has been at a point prior to the video amplifier, whereas the signal in which the pulses are cancelled are derived from the output of the video amplifier circuit. In such a system it is possible that there will be some difference between the shapes of the two pulses since those translated through the video amplifier have been subjected to further amplification and shaping (for example in the peaking circuit 24) so that less than perfect cancellation takes place. In the present circuit, more complete noise cancellation is possible because the exact noise pulses to be cancelled (pulses 72′, 73′) are the ones which are amplitude separated and utilized to cancel themselves. Therefore, this system provides improved cancellation as well as a less expensive and less critical system to construct and adjust.

I claim:

1. A noise cancelling circuit for a television receiver utilizing a demodulated television signal having video and synchronizing components, which signal may be accompanied by noise pulses exceeding the amplitude of the synchronizing components, including in combination; video amplifier means for the demodulated television signal, said video amplifier means including an amplifier device and a video load impedance connected thereto, a noise inverter device having input, common and output electrodes, said common electrode coupled to a substantially stable direct current potential, means connecting said input electrode to said video load impedance so that the television signal appears between said input and common electrodes with the synchronization components polarized tending to cause increased conduction of said noise inverter device, circuit means including a potential source and a potentiometer coupled to said output electrode to provide an adjustable potential on said output electrode of a value with respect to the direct current potential on said common electrode to establish conduction of said noise inverter device only for noise pulses exceeding the amplitude of the synchronizing components so that inverted amplitude separated noise pulses appear at said output electrode, and synchronizing signal utilization means coupled to said output electrode of said noise inverter device and to said video load impedance so that noise pulses are balanced out of the television signal applied to said utilization means.

2. The noise cancelling circuit according to claim 1 in which said noise inverter device is a vacuum tube and said input, common and output electrodes are grid, cathode and plate electrodes, respectively.

3. The noise cancelling circuit according to claim 1, said video load impedance connected between said amplifier device and said direct current potential, said means connecting said input electrode to said video load impedance being a resistor to apply the television signal to the noise inverter device and to establish a fixed bias therefor.

4. The noise cancelling circuit according to claim 1 further including a resistor direct current coupled between the video load impedance and the synchronizing signal utilization means for applying the television signal thereto, and a coupling capacitor connected between said output electrode and said resistor to apply amplitude separated and inverted noise pulses to said resistor for cancellation of the corresponding noise pulses accompanying the television signal.

5. The noise cancelling circuit according to claim 1 in which said noise inverter device is a vacuum tube and said input, common and output electrodes are grid, cathode and plate electrodes respectively, said video load impedance including a first resistor connected to said direct current potential, said means connecting said input electrode to said video load impedance comprising a second resistor connected between said first resistor and said grid electrode to direct current couple the television signal to said vacuum tube and to establish a fixed bias therefor.

6. The noise cancelling circuit according to claim 5 further including a third resistor connected between said grid electrode and said synchronizing signal utilization means for applying the television signal thereto, and a coupling capacitor connected between said plate electrode and said third resistor to apply amplitude separated and inverted noise pulses to said third resistor for cancellation of the corresponding noise pulses accompanying the video signal.

7. The noise cancelling circuit according to claim 1, said circuit means further including resistance means connected to said potentiometer and to said output electrode to form a voltage divider for selecting the portion of the potential from said potential source to be applied to said output electrode.

References Cited

UNITED STATES PATENTS

| | | | |
|---|---|---|---|
| 2,207,587 | 7/1940 | Kaar. | |
| 2,680,806 | 6/1954 | Beste. | |
| 2,783,277 | 2/1957 | Wofford. | |
| 3,182,122 | 5/1965 | Lin Kao | 178—7.3 |
| 3,182,123 | 5/1965 | Lin Kao | 178—7.3 |

RICHARD MURRAY, Primary Examiner

ROBERT L. RICHARDSON, Assistant Examiner